0
United States Patent Office
3,101,293
Patented Aug. 20, 1963

3,101,293
CONTROLLED RELEASE COMPOSITIONS AND
THEIR PREPARATION
William E. Gaunt, Shaker Heights, and Robert P. Tansey, Hudson, Ohio, assignors to Strong Cobb Arner Inc., Cleveland, Ohio, a corporation of New York
No Drawing. Filed Apr. 28, 1961, Ser. No. 106,152
12 Claims. (Cl. 167—82)

This invention relates to compositions for the control of the rate of solubilization of drugs and other substances including gel matrices for the retention and protection of such drugs and other substances and procedure for preparing the same. The invention also relates to further applications of such compositions to endow drugs and other substances with unique and desirable properties. This application is a continuation in part of our pending application Serial Number 29,575, filed May 17, 1960, now abandoned.

The problem of controlling the rate of solubilization of drugs into alimentary fluids varying in pH from the acidity of gastric juices to the alkalinity of intestinal fluids is recognized as being a particularly difficult one.

The present invention effectively solves this problem based upon the discovery that surprising and unexpected results occur, as hereinafter set forth, when the drug or other substances is incorporated in an intimate mixture of acid-resistant alkali-susceptible materials with alkali-resistant acid-susceptible materials. It has been found that satisfactory acid-resistant alkali-susceptible materials are the acetate phthalate esters of polymeric carbohydrates such as cellulose acetate phthalate and starch acetate phthalate and phthalic acid derivatives of polyacrylic acid and that satisfactory alkali-resistant acid-susceptible materials are the aluminum salts of carboxylic acids having 2 to 22 carbon atoms.

The most intimate mixture of acid-resistant alkali-susceptible material and alkali-resistant acid-susceptible material that can be obtained is to dissolve them in a mutually compatible volatile solvent and subsequently to remove the solvent by evaporation or volatilization. This, however, in itself presents a problem in connection with the cellulose acetate phthalate and the aluminum salts of the said carboxylic acids because the former is soluble in polar solvents such as the lower alcohols and acetone and insoluble in non-polar solvents such as the hydrocarbons and halogenated hydrocarbons, whereas the latter are insoluble in polar solvents but soluble in non-polar solvents. It has been found, in accordance with this invention, that this paradox can be resolved by dissolving cellulose acetate phthalate in a non-polar solvent such as methylene chloride in the presence of some 10 percent of a polar solvent such as methanol. It has been further found that the presence of this percentage of polar solvent does not materially interfere with the solubility or behavior in a non-polar solvent of the aluminum salts of the carboxylic acids. In this way, and using a solvent mixture of 90 percent methylene chloride and 10 percent methanol as an example, a truly intimate mixture of acid-resistant alkali-susceptible and alkali-resistant acid-susceptible materials is obtained by separately dissolving each material in a portion of the solvent mixture, combining the two solutions and then removing the solvent by evaporation. For example, cellulose acetate phthalate is dissolved in a quantity of a 90 percent methylene chloride–10 percent methanol solvent mixture, aluminum octoate is separately dissolved in a quantity of the same solvent mixture, the solutions are combined and the solvent mixture is then removed by evaporation. In another example, a therapeutic agent, cellulose acetate phthalate and aluminum octoate are mixed until uniform and the solvent solution of 90% methylene chloride–10% methanol added rapidly thereto.

When such is done, however, a phenomenon occurs which is completely unexpected and unpredictable. The mixed solutions become rapidly transformed into a clear, firm, homogeneous, brittle gel and the clear, homogeneous gel state is retained during and after the removal of the solvents by evaporation. The dried gel is clear, colorless, tough, resilient and hard, but can, by considerable effort or forces, be broken up into small particles or granules. From this it is apparent that an intimate mixture of acid-resistant alkali-susceptible material and alkali-resistant acid-susceptible material was achieved beyond all expectation and to the extent that an interaction of the materials took place to form a composition of matter or complex as a homogeneous gel state.

The polar solvents which can be used are the lower alcohols such as methanol, ethanol and the propanols, and the lower ketones such as acetone.

The non-polar solvents which can be used are the halogenated hydrocarbons, such as methylene chloride, ethylene dichloride, chloroform, carbon tetrachloride, etc.

The acid-resistant alkali-susceptible materials which can be used are phthalic acid derivatives of polymers such as those of cellulose acetate, starch acetate and polyacrylic acid.

The acid-susceptible alkali-resistant materials which can be used are the aluminum salts of carboxylic acids having from 2 to 22 carbon atoms, such as aluminum acetate, aluminum hexoate, aluminum octoate, aluminum stearate and aluminum palmitate. When using aluminum octoate, or aluminum salts of lower fatty acids the transformation takes place in the cold, but when aluminum stearate and palmitate are used some heat is required. For example, when using aluminum tristearate in 90 percent chloroform–10 percent ethanol a temperature of about 60 degrees C. is required for the transformation to the clear, firm, brittle gel.

It has further been found that the ratio of non-polar solvent to polar solvent can usefully range from 50 percent non-polar/50 percent polar to 95 percent non-polar/5 percent polar, and that the most rapid formation of the gel occurred in the range from 80 percent non-polar/20 percent polar to 90 percent non-polar/10 percent polar.

It was still further found that the proportions of cellulose acetate phthalate and aluminum soap can be varied within wide limits. All proportions from 50 parts of cellulose acetate phthalate to 1 part of aluminum soap to 1 part cellulose acetate phthalate to 50 parts of aluminum soap interact as above described to form the homogeneous gel. The most rapid transformation to the gel state occurs with proportions lying between 10 parts of cellulose acetate phthalate to 1 part of aluminum soap and 1 part cellulose acetate phthalate to 10 parts of aluminum soap.

In view of the considerable number of aluminum soaps which can be used and the widely varying proportions of cellulose acetate phthalate and aluminum soap which can be transformed into the homogeneous gel state, it is apparent that a great variety of new compositions of matter can be made with different extents of resistance and susceptibility to acids and alkalis.

These gel matrices are not ordinarily employed as such as their primary utility is in connection with the incorporation therein of drugs, oils and other substances which, depending upon the particular gel, release or solubilize the drugs, oils and other substances in accordance with a predetermined desired pattern, as will be more particularly apparent from the examples hereinafter set forth. These gel matrices are of special interest in the preparation of so-called sustained release dosage forms of therapeutic materials, the rate of release being controlled by the total amount of gel used in relationship to the drug and the proportion of cellulose acetate phthalate to aluminum soap entering into the composition of the gel. Higher proportions of cellulose acetate phthalate suppress the rate of release of the drug into artificial gastric juice and increase the rate of release into artificial intestinal fluids. Moreover, the larger the proportion of total gel to therapeutic material, the slower is the rate of release of the drug.

In addition to their usefulness in the preparation of sustained release dosage forms of therapeutic materials, the gel matrices can be produced and used in such manner that there is no release whatever of therapeutic ingredient in gastric juice and full release on the alkaline side in intestinal fluid as in the case of vitamin $B_{12}$ or polyvinyl pyrrolidine-iodine complex. They can also be used to protect sensitive chemicals or drugs against oxidation, light, moisture, etc., as well as against the antagonistic action of other drugs, e.g., anti-histamines against aspirin. The gel matrix form of composition reduces the taste or bitterness of the incorporated substance; it can, furthermore, be used to hold or imprison therapeutic and diagnostic dyes such as methylene blue or pyridium (phenylazo-$\alpha,\alpha$-diamino-pyridine monohydrochloride) for release or solubilization, as required.

Many of the drugs which have been used in combination with these new gels have proved to be most tractable in that they are themselves soluble in the mixed non-polar/polar solvents used. For instance, hydroxazine hydrochloride, phenmetrazine hydrochloride, vitamin $B_{12}$, the phenothiazines, the corticosteroids and the polyvinyl pyrrolidine-iodine complex dissolve in 90 percent methylene chloride/10 percent methanol solvent and the gel formed from the interaction of cellulose acetate phthalate and aluminum soap in the presence of these drugs is clear, firm and brittle and remains clear after the evaporation of the solvent and is a most truly homogeneous composition of drug, acid-resistant, alkali-susceptible and alkali-resistant acid-susceptible materials. It has, however, been found not necessary for the drugs to be soluble in the non-polar/polar solvent mixtures used in order to incorporate them into the gel. Finely divided drugs (60 mesh or smaller) can be suspended in the solution of the cellulose acetate phthalate prior to the addition of the solution of aluminum soap. Upon removal of the solvent, the dried gel is found to have the drug discretely and uniformly distributed throughout its mass.

The new gel structures can be plasticised for example with propylene glycol and other glycols. They can also be made to embody high proportions of oils up to about 50 percent or more while still remaining solid and preventing the oils from bleeding out.

The invention is illustrated by the following non-limitative examples:

*Example 1*

Two grams of cellulose acetate phthalate is dissolved in 15 ml. of a mixed solvent of 90 percent methylene chloride and 10 percent methanol. Two grams of atarax hydrochloride is added to this solution, which is held until complete solution is obtained. To 10 grams of aluminum octoate is added 30 mls. of the methylene chloride-methanol solvent with rapid stirring to give a homogeneous dispersion which is then transferred to the cellulose acetate phthalate-atarax hydrochloride solution. Upon rapid stirring a clear, firm, brittle gel is formed which breaks into discrete particles. The gel particles are transferred to a tray and the solvent permitted to evaporate. The clear, hard, brittle solid obtained is broken up into small particles which are hereinafter referred to as preparation A.

In similar fashion, small particles composed of 2 parts atarax, 3 parts cellulose acetate phthalate and 9 parts aluminum octoate, hereinafter referred to as preparation B, and 2 parts atarax, 4 parts cellulose acetate phthalate, and 8 parts aluminum octoate, hereinafter referred to as preparation C, may be made. The volume of methylene chloride-methanol solvent used in dissolving the cellulose acetate phthalate is increased and the amount of solvent used for the aluminum octoate is decreased.

In comparative tests, using granules of similar size, preparations A, B and C showed the following approximate release characteristics when exposed to extraction with artificial gastric juice and artificial intestinal fluid.

|  | Percent active material dissolved | | |
| --- | --- | --- | --- |
|  | A | B | C |
| After 1 hour exposure to gastric juice | 44 | 36 | 24 |
| After 2 hours subsequent exposure to artificial intestinal fluid | 13 | 15 | 29 |
| After 2 hours additional exposure to artificial intestinal fluid | 9 | 10 | 23 |

This example illustrates the influence of differing ratios of cellulose acetate phthalate and aluminum octoate on the solubility of a drug in alimentary fluids.

*Example 2*

2 grams of cellulose acetate phthalate is dissolved in 15 ml. of a mixture of 90% methylene chloride–10% methanol. 2 grams of atarax hydrochloride is added to this solution and stirred until completely dissolved. To 4 grams of aluminum octoate is added 15 ml. of the methylene chloride-methanol solvent with rapid stirring and this dispersion added to the cellulose acetate phthalate-atarax hydrochloride solution. With rapid stirring a clear, firm, brittle gel is formed which breaks into discrete particles. On removal of the solvent, clear, hard particles are obtained (preparation D).

*Example 3*

In similar fashion clear hard particles of 2 grams of atarax hydrochloride, 4 grams of cellulose acetate phthalate and 2 grams of aluminum octoate are made (preparation E).

The above preparations provide the following release characteristics:

|  | Percent active material dissolved | |
| --- | --- | --- |
|  | D | E |
| After 1 hour exposure to artificial gastric juice | 92 | 43 |
| After 2 hours subsequent exposure to artificial intestinal fluid | 8 | 57 |

Again the data indicate the influence of differing ratios of cellulose acetate phthalate and aluminum octoate on the rate of solubilization of the drug. In addition, the ratio of cellulose acetate phthalate and aluminum octoate used in preparation D is the same as that in preparation C. However, in preparation C the ratio of drug to total matrix is 1 to 6, and in preparation D it is 1 to 3, and the data show that the rate of dissolution of the drug is markedly influenced by the proportion of drug to total matrix.

*Example 4*

10 grams of cellulose acetate phthalate are dissolved in 100 ml. of 90% methylene chloride–10% methanol and 10 grams of phenobarbital added. To this mixture are added 10 grams of aluminum octoate in 30 ml. of 90% methylene chloride–10% methanol. The firm, brittle gel formed on stirring is allowed to dry and the dried gel broken down into small particles. These particles can be held on the tongue for an appreciable time before the taste of phenobarbital is evident.

Example 5

10 grams of polyvinylpyrrolidine-iodine complex are dissolved in 40 ml. of 90% methylene chloride–10% methanol. 9 grams of cellulose acetate phthalate are dissolved in 60 ml. of the same solvent mixture and added to the solution of polyvinylpyrrolidine-iodine complex. 1 gram of aluminum octoate made into a smooth paste with 5 ml. of methanol is added and the mixture stirred. A firm, brittle, clear brown gel is rapidly formed. On evaporation of the solvent, the clear, hard gel is broken down into small particles. On exposing these particles to artificial gastric juice no polyvinylpyrrolidine-iodine complex is released into solution. On exposure to artificial intestinal fluid, the fluid rapidly became brown as the polyvinylpyrrolidine-iodine complex dissolves.

Example 6

2.5 mg. of vitamin $B_{12}$ are dissolved in 25 ml. of 90% methylene chloride–10% methanol. 1 gram of cellulose acetate phthalate is dissolved in this solution. 100 mg. of aluminum octoate are dispersed into 3 ml. of 90% methylene chloride–10% methanol and added to the vitamin $B_{12}$-cellulose acetate phthalate solution. A clear, firm, brittle pink gel is rapidly formed. On removal of the solvent, the clear, hard, pink dry gel may be broken down into smaller particles. These particles are resistant to artificial gastric juice but dissolve in artificial intestinal fluid which becomes pink.

Example 7

10 grams of cellulose acetate phthalate are dissolved in 70 ml. of 90% methylene chloride–10% methanol. 10 ml. of corn oil are dissolved in 20 ml. of 90% methylene chloride–10% methanol and this solution added to the cellulose acetate phthalate. 10 grams of aluminum octoate dispersed in 30 ml. of 90% methylene chloride–10% methanol are immediately added and the mixture rapidly stirred. The mixture is transformed into a firm gel, which, on removal of the solvent, is transformed into a translucent, hard, brittle solid.

Example 8

10 grams of cellulose acetate phthalate are dissolved in 70 ml. of 90% methylene chloride–10% methanol. 10 ml. of mineral oil are dissolved in 20 ml. of 90% methylene chloride–10% methanol and this solution added to the cellulose acetate phthalate solution. 10 grams of aluminum octoate dispersed in 30 ml. of 90% methylene chloride–10% methanol are immediately added and the mixture rapidly stirred. The mix is transformed into a firm gel, which, on removal of the solvent, is transformed into a translucent, somewhat pliable solid.

Example 9

10 grams of cellulose acetate phthalate are dissolved in 70 ml. of 90% methylene chloride–10% methanol. To this solution is slowly added 10 ml. of propylene glycol followed by 10 grams of aluminum octoate dispersed in 30 ml. of 90% methylene chloride–10% methanol. A clear, firm gel is obtained, which, on removal of the solvent, becomes a tough, flexible, clear, solid gel.

Example 10

10 grams of cellulose acetate phthalate is dissolved in 70 ml. of 90 percent chloroform–10 percent ethanol and 10 grams of hexyl resorcinol added. To the clear solution obtained are added 2 grams of aluminum tristearate and the mixture is stirred and heated in a warm water bath to 60° C. On continued mixing the solution obtained thickens to a firm clear gel. On removal of the solvent by evaporation, a clear flexible solid gel is obtained.

Example 11

30 grams of anhydrous ferrous sulphate powder is suspended in a solution of 10 grams of cellulose acetate phthalate in 90 percent methylene chloride–10 percent methanol. To this suspension is added, with stirring, 2 grams of aluminum octoate dispersed in the methylene chloride–methanol solvent. The firm, brittle gel obtained on continued mixing is dried by evaporation of the solvent and the dried solid gel obtained broken into smaller pieces, each containing discrete particles of ferrous sulphate uniformly distributed throughout.

Example 12

2 grams of a phthalic acid derivative of polyacrylic acid is dissolved in 20 ml. of 90 percent methylene chloride–10 percent methanol. 10 mg. of crystalline vitamin $B_{12}$ are added and the mixture stirred until the vitamin $B_{12}$ dissolves. To this solution is added a dispersion of 500 mg. aluminum octoate in 5 ml. of 90 percent methylene chloride–10 percent methanol with continuous mixing. The mass slowly is transformed into a firm gel. On removal of the solvent by evaporation, a clear pink solid gel is obtained which does not release vitamin $B_{12}$ on exposure to artificial gastric juice, but does so on exposure to artificial intestinal fluid.

Example 13

2 grams of starch acetate phthalate is dissolved in 15 ml. of 90 percent methylene chloride–10 percent methanol. 10 mg. of crystalline vitamin $B_{12}$ is added and the mixture stirred until the vitamin $B_{12}$ is dissolved. To this solution is added a dispersion of 500 mg. aluminum octoate in 5 ml. of 90 percent methylene chloride–10 percent methanol with continuous stirring. A firm, clear pink gel is formed which, on removal of the solvent by evaporation, gives a clear pink solid gel which does not release vitamin $B_{12}$ on exposure to artificial gastric juice, but does do so slowly on exposure to artificial intestinal fluids.

Example 14

4 grams of basic aluminum acetate are suspended in 25 ml. of a solvent mixture of 90% methylene chloride and 10% methanol. 5 grams of cellulose acetate phthalate are dissolved in 40 ml. of this same solvent mixture. The aluminum acetate suspension is added to the cellulose acetate phthalate solution, and the mixture stirred. During the course of mixing a firm gel is formed which, on removal of the solvent by evaporation, is transformed into a hard, brittle solid.

Example 15

4 grams of aluminum hexoate are dispersed in 20 ml. of a mixed solvent composed of 90% methylene chloride and 10% methanol. 5 grams of cellulose acetate phthalate are dissolved in 40 ml. of this same solvent mixture. The dispersion of aluminum hexoate is added to the cellulose acetate phthalate solution with stirring. A clear, firm, brittle gel is produced which, on continued stirring, breaks up into discrete particles. On removal of the solvent by evaporation, these particles become hard and brittle.

Example 16

| | |
|---|---|
| Spironolactone | grams__ 10 |
| Cellulose acetate phthalate, #60 mesh | do____ 9 |
| Aluminum octoate | do____ 1 |
| Methylene chloride-methanol (9:1) | ml__ 100 |

The spironolactone, cellulose acetate phthalate, and aluminum octoate are mixed together until a uniform blend is obtained. This mixture is then screened through a #40 mesh screen. The solvent solution is rapidly added to the powder mixture with stirring. A clear, firm, brittle gel is formed which, on removal of the solvent by evaporation, dries to clear, hard, brittle particles.

Example 17

Crystalline vitamin $B_{12}$ _____ mg__ 100
Cellulose acetate phthalate, #60 mesh _____ grams__ 9
Aluminum octoate _____ do____ 1

A uniform blend of the cellulose acetate phthalate and aluminum octoate is prepared. This blend is added to 90 ml. of methylene chloride with stirring until a uniform suspension is obtained. The vitamin $B_{12}$ is dissolved in 10 ml. of methanol, and this solution added to the methylene chloride suspension of cellulose acetate phthalate and aluminum octoate. The mixture is stirred and is rapidly transformed into a uniformly clear gel. On removal of the solvent by evaporation, the gel is transformed into clear, red, hard, brittle particles.

The foregoing is intended as illustrative and not as limitative since, within the purview of the appended claims, modifications can be made without departing from the invention. It will, in particular, be understood that the foregoing references to cellulose acetate phthalate, starch acetate phthalate and the phthalic acid derivative of a polyacrylic acid resin are presented as examples of the phthalic acid derivations of high molecular weight carbohydrate or related polymers. It will further be appreciated that the particular aluminum salts named above are representative only as all aluminum salts of the said carboxylic acids having 2 to 22 carbon atoms are successfully utilizable in the invention.

What is claimed is:

1. A process for preparing a controlled release composition which regulates the rate of release of a therapeutic agent into alimentary fluids varying in pH from the acidity of gastric juice to the alkalinity of intestinal fluids which comprises combining a solution of an acid-resistant alkali-susceptible material in a non-polar/polar solvent mixture containing at least about 50% non-polar solvent with a separate solution of an alkali-resistant acid-susceptible material in the same solvent mixture, incorporating a therapeutic agent into one of said solutions prior to combining the solutions, removing solvent from the gel structure which forms and breaking the dried gel into particles, whereby each gel particle has the therapeutic agent substantially uniformly dispersed therethrough in discrete form.

2. The process of claim 1, in which the gel structure is formed in the cold.

3. The process of claim 1, in which the gel structure is formed under mild heating to a temperature of about 60° C.

4. The process of claim 1, in which the non-polar/polar solvent mixture is comprised of 90% methylene chloride and 10% methanol.

5. The process of claim 1, in which the acid-resistant alkali-susceptible material is cellulose acetate phthalate.

6. The process of claim 1, in which the alkali-resistant acid-susceptible material is an aluminum salt of a carboxylic acid having from 2 to 22 carbon atoms.

7. The process of claim 1, in which the acid-resistant alkali-susceptible material is cellulose acetate phthalate, the alkali-resistant acid-susceptible material is aluminum octoate and the solvent mixture is comprised of 90% methylene chloride and 10% methanol.

8. The process of claim 1, in which the acid-resistant alkali-susceptible material is starch acetate phthalate, the alkali-resistant acid-susceptible material is aluminum octoate and the solvent mixture is comprised of 90% methylene chloride and 10% methanol.

9. The clear, firm gel matrix obtained when a solution of an acid-resistant alkali-susceptible material in a non-polar/polar solvent mixture containing at least about 50% non-polar solvent is combined with a solution of an alkali-resistant acid-susceptible material in the same solvent mixture and the solvent removed, said gel matrix when combined with a therapeutic agent acting to release said agent over a prolonged period of time according to a preselected release pattern.

10. The gel of claim 9 subdivided into granules through each of which a therapeutic agent is substantially uniformly dispersed in discrete form.

11. The gel matrix of claim 9 subdivided into granules in which particles of a therapeutic agent are incorporated and in which the acid-resistant alkali-susceptible material is cellulose acetate phthalate and the alkali-resistant acid-susceptible material is an aluminum salt of a carboxylic acid containing 2 to 22 carbon atoms.

12. The gel granules of claim 11, in which the aluminum salt is aluminum octoate.

References Cited in the file of this patent

UNITED STATES PATENTS

| | | |
|---|---|---|
| 2,805,977 | Robinson et al. | Sept. 10, 1957 |
| 2,928,769 | Gaunt | Mar. 15, 1960 |
| 2,987,445 | Levesque | June 6, 1961 |